(12) United States Patent
Castillo et al.

(10) Patent No.: US 11,302,996 B2
(45) Date of Patent: Apr. 12, 2022

(54) BATTERY MODULES WITH INTEGRATED INTERCONNECT BOARD ASSEMBLIES HAVING CELL TAB COMB FEATURES

(71) Applicant: GM GLOBAL TECHNOLOGY OPERATIONS LLC, Detroit, MI (US)

(72) Inventors: Brittany A. Castillo, Shelby Township, MI (US); Nicholas R. Bratton, Royal Oak, MI (US); Robert J. Heydel, Clawson, MI (US); Igor M. Kan, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 443 days.

(21) Appl. No.: 16/544,237

(22) Filed: Aug. 19, 2019

(65) Prior Publication Data
US 2021/0057708 A1 Feb. 25, 2021

(51) Int. Cl.
*H01M 50/502* (2021.01)
*H01M 10/613* (2014.01)
(Continued)

(52) U.S. Cl.
CPC ............ *H01M 50/502* (2021.01); *B60K 1/04* (2013.01); *B60L 50/64* (2019.02); *B60L 50/66* (2019.02); *H01M 10/613* (2015.04); *H01M 10/625* (2015.04); *H01M 10/647* (2015.04); *H01M 10/6556* (2015.04); *H01M 50/20* (2021.01); *H01M 50/543* (2021.01); *B60K 6/28* (2013.01); *B60K 2001/005* (2013.01); *B60Y 2200/91* (2013.01); *B60Y 2200/92* (2013.01); *B60Y 2400/112* (2013.01); *H01M 2220/20* (2013.01)

(58) Field of Classification Search
CPC ............ H01M 10/613; H01M 10/625; H01M 10/647; H01M 10/6556; H01M 50/543; H01M 50/20; H01M 50/502; B60L 50/64; B60L 50/66; B60K 1/04; B60K 6/28; B60K 2001/005; B60Y 2200/91; B60Y 2200/92; B60Y 2400/112
USPC ........................................................ 180/65.1
See application file for complete search history.

(56) References Cited

U.S. PATENT DOCUMENTS

6,103,075 A   8/2000   Winsel et al.
6,639,385 B2  10/2003  Verbrugge et al.
(Continued)

*Primary Examiner* — John D Walters
*Assistant Examiner* — Hilary L Johns
(74) *Attorney, Agent, or Firm* — Quinn IP Law (57) ABSTRACT

Presented are integrated electrical interconnect board (ICB) assemblies for battery modules, rechargeable traction battery packs equipped with such ICB assemblies, and methods for making/using such ICB assemblies. A battery module for storing and supplying electrical energy includes multiple battery cells that are stacked in side-by-side facing relation with one another and each has a battery cell casing with an electrical terminal projecting therefrom. An electrically insulating module housing has a housing base that supports thereon the stacked battery cells. An integrated ICB assembly, which is attached to the module housing, includes a central cover in spaced facing relation to the housing base, endwalls projecting from the central cover, and multiple busbar connectors attached to the endwalls and electrically connected to the battery cells' electrical terminals. Each endwall has multiple elongated slots that extend from a distal edge of the endwall and slidably receives therethrough one of the electrical terminals.

20 Claims, 4 Drawing Sheets

(51) Int. Cl.
  *H01M 10/625* (2014.01)
  *H01M 10/647* (2014.01)
  *H01M 10/6556* (2014.01)
  *B60K 1/04* (2019.01)
  *B60L 50/64* (2019.01)
  *B60L 50/60* (2019.01)
  *H01M 50/20* (2021.01)
  *H01M 50/543* (2021.01)
  *B60K 1/00* (2006.01)
  *B60K 6/28* (2007.10)

(56) References Cited

U.S. PATENT DOCUMENTS

| | | |
|---|---|---|
| 6,641,942 B1 | 11/2003 | Rouillard et al. |
| 7,109,685 B2 | 9/2006 | Tate, Jr. et al. |
| 7,324,902 B2 | 1/2008 | Verbrugge et al. |
| 7,373,264 B2 | 5/2008 | Verbrugge et al. |
| 7,612,532 B2 | 11/2009 | Verbrugge |
| 7,768,233 B2 | 8/2010 | Lin et al. |
| 7,928,690 B2 | 4/2011 | Koch et al. |
| 8,035,986 B2 | 10/2011 | Koetting et al. |
| 8,054,046 B2 | 11/2011 | Lin et al. |
| 8,108,160 B2 | 1/2012 | Liu et al. |
| 8,170,818 B2 | 5/2012 | Lin et al. |
| 8,198,864 B2 | 6/2012 | Koch et al. |
| 8,212,519 B2 | 7/2012 | Koch et al. |
| 8,321,164 B2 | 11/2012 | Liu et al. |
| 8,581,543 B2 | 11/2013 | Koch et al. |
| 8,645,088 B2 | 2/2014 | Schaefer et al. |
| 8,836,280 B2 | 9/2014 | Koch et al. |
| 9,172,118 B2 | 10/2015 | Marsh et al. |
| 9,176,194 B2 | 11/2015 | Meisner et al. |
| 9,178,192 B2 | 11/2015 | Payne |
| 9,337,484 B2 | 5/2016 | Verbrugge et al. |
| 9,354,277 B2 | 5/2016 | Lin et al. |
| 9,461,490 B2 | 10/2016 | Ying |
| 9,513,338 B2 | 12/2016 | Koch et al. |
| 2011/0309838 A1 | 12/2011 | Lin et al. |
| 2014/0297084 A1 | 10/2014 | Meisner et al. |
| 2015/0017508 A1 | 1/2015 | Khakhalev |
| 2015/0162571 A1 | 6/2015 | Ogg et al. |
| 2015/0301116 A1 | 10/2015 | Baker et al. |
| 2015/0318502 A1 | 11/2015 | Kanai |
| 2016/0039419 A1 | 2/2016 | Wampler et al. |
| 2016/0077160 A1 | 3/2016 | Wampler, II et al. |
| 2016/0254562 A1 | 9/2016 | Morris-Cohen et al. |
| 2016/0259011 A1 | 9/2016 | Joe |
| 2016/0293991 A1 | 10/2016 | Goeltz et al. |
| 2016/0336552 A1 | 11/2016 | MacLean et al. |
| 2016/0372777 A1 | 12/2016 | Buckley et al. |
| 2017/0077507 A1 | 3/2017 | Harada et al. |
| 2018/0375132 A1 | 12/2018 | Li et al. |
| 2019/0126770 A1 | 5/2019 | Koch et al. |
| 2019/0157710 A1 | 5/2019 | Makino et al. |

BATTERY MODULES WITH INTEGRATED INTERCONNECT BOARD ASSEMBLIES HAVING CELL TAB COMB FEATURES

INTRODUCTION

The present disclosure relates generally to electric storage systems employing rechargeable batteries. More specifically, aspects of this disclosure relate to electrical interconnect boards for traction battery packs of electric-drive vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and efficiency. Such engines include compression-ignited (CI) diesel engines, spark-ignited (SI) gasoline engines, two, four, and six-stroke architectures, and rotary engines, as some non-limiting examples. Hybrid electric and full electric vehicles, on the other hand, utilize alternative power sources to propel the vehicle, such as an electric motor generator unit (MGU), and therefore minimize or eliminate reliance on a fossil-fuel based engine for tractive power.

A full electric vehicle (FEV)—colloquially identified as an "electric car"—is a type of electric-drive vehicle configuration that altogether removes the internal combustion engine and attendant peripheral components from the powertrain system, relying solely on electric traction motors for propulsion and for supporting accessory loads. The engine assembly, fuel supply system, and exhaust system of an ICE-based vehicle are replaced with a single or multiple traction motors, a traction battery back, and battery cooling and charging electronics in an FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered electric motor. Since hybrid vehicles are able to derive their power from sources other than the engine, HEV engines may be turned off, in whole or in part, while the vehicle is propelled by the electric motor(s).

Most commercially available hybrid electric and full electric vehicles (collectively "electric-drive vehicles") employ a rechargeable traction battery pack to store and supply the requisite power for operating the powertrain's motor/generator unit(s). In order to generate tractive power with sufficient vehicle range, a traction battery pack is significantly larger, more powerful, and higher in capacity than a standard 12-volt starting, lighting, and ignition (SLI) battery. Contemporary traction battery packs (also referred to as "electric vehicle battery" or "EVB") group discrete stacks of battery cells into individual battery modules that are mounted onto the vehicle chassis, e.g., via a battery housing or support tray. Stacked electrochemical battery cells are connected in series or parallel through use of an electrical interconnect board (ICB). Some vehicle battery systems employ multiple independently-operable, high-voltage battery packs to provide higher voltage delivery and greater system capacity through increased amp-hours. A dedicated Battery Pack Control Module (BPCM), through collaborative operation with a Powertrain Control Module (PCM), regulates the opening and closing of battery pack contactors to govern which pack or packs will power the vehicle's traction motor(s) at a given time.

SUMMARY

Presented herein are integrated electrical ICB assemblies for rechargeable battery modules, electric-drive vehicles with traction battery packs equipped with such ICB assemblies, and methods for making and methods for using disclosed ICBs, battery modules, and vehicles. By way of example, an integrated interconnect board is presented with a cell tab comb feature for simplified manufacture and installation of the ICB into the battery module assembly. The ICB includes a C-shaped module jacket with a pair of opposing endwalls projecting orthogonally from a central cover. A series of vertical slots formed into each endwall allows the integrated ICB assembly to mount vertically onto the cell stack and comb the cells during ICB installation. Doing so helps to eliminate superfluous assembly steps and provides a reduced-risk installation operation. Disclosed integrated ICB designs also help to minimize manufacturing tooling by incorporating tooling features into the design. ICB comb features also increase the ease of assembly of the battery module, and reduce the risk of cells being inadvertently fed through the incorrect ICB slots or accidental cell jamming during insertion (e.g., cells shorting together).

Aspects of this disclosure are directed to rechargeable energy storage systems (RESS) employing battery modules to store and supply electrical energy. In an example, a battery module is presented for use in automotive applications (e.g., hybrid and electric vehicles) and non-automotive applications (e.g., portable and emergency generators) alike. This representative battery module includes multiple battery cells that are stacked in side-by-side facing relation with one another. Each battery cell includes a battery cell casing (e.g., can, prism, or pouch) with one or more electrical terminals extending from the casing. The battery cells may take on any suitable electrochemical cell construction, including lead-acid, nickel-metal hydride, lithium-ion, lithium-ion polymer, zinc-air, lithium-air, nickel-cadmium, valve-regulated lead-acid, absorbed glass mat, nickel-zinc, etc.

Continuing with the discussion of the above example, the battery module also includes a rigid, electrically insulating module housing with a housing base that supports thereon the stacked battery cells. An integrated ICB assembly is attached, e.g., via snap fasteners, threaded fasteners, adhesives, rivets, etc., to the module housing. The ICB assembly includes a central cover that is oriented in spaced facing relation to the housing base, e.g., sandwiching therebetween the stacked battery cells. A pair of endwalls project from opposing ends of the central cover; multiple electrical busbar connectors are attached to the endwalls and electrically connected to the electrical terminals of the battery cells. One or both of the endwalls is fabricated with a series of vertically elongated, transversely spaced slots. Each slot extends from a distal edge of the endwall, creating an opening through the endwall edge to slidably receive therethrough one of the electrical terminals.

Additional aspects of this disclosure are directed to motor vehicles and in-vehicle traction battery packs equipped with any of the disclosed integrated ICB assemblies. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, an electric-drive motor vehicle includes a vehicle body with multiple road wheels and other standard original equipment. One or more traction motors is/are mounted on the vehicle body and operate alone (e.g., for FEV applications) or in conjunction with an internal combustion engine (e.g., for HEV applications) to drive one or more of the road wheels to thereby propel the vehicle.

Continuing with the discussion of the above example, the motor vehicle also includes a traction battery pack that is mounted on the vehicle body and operable to power the traction motor(s). The traction battery pack includes several battery modules, each of which includes an array of electrochemical battery cells stacked in side-by-side facing relation with one another. Each electrochemical battery cell includes a battery cell casing with positive and negative electrical terminals extending from one end of the casing. Each battery module is assembled with an electrically insulating module housing with multiple housing walls and a housing base that supports thereon the stacked battery cells. An integrated ICB assembly, which is mounted on the module housing, includes a central cover in spaced facing relation to the housing base, a pair of endwalls projecting generally orthogonally from opposing ends of the central cover, and electrical busbar connectors mounted on the endwalls and electrically connected to the battery cells terminals. Each endwall is formed with a series of elongated slots that extend from a distal edge of the endwall and slidably receive therethrough a respective one of the electrical terminals.

Aspects of this disclosure are also directed to methods for manufacturing and methods for operating any of the disclosed ICB assemblies, battery modules, and motor vehicles. In an example, a method is presented for assembling a battery module for storing and supplying electrical energy. The representative method includes, in any order and in any combination with any of the above and below options and features: stacking a plurality of battery cells in side-by-side facing relation with one another, each of the battery cells including a battery cell casing with an electrical terminal extending therefrom; seating the stacked battery cells on a housing base of an electrically insulating module housing; attaching an integrated ICB assembly to the module housing, the integrated ICB assembly including a central cover positioned in spaced facing relation to the housing base, endwalls projecting from opposing ends of the central cover, and a plurality of electrical busbar connectors attached to the endwalls, one or both of the endwalls defining a plurality of elongated slots each extending from a distal edge of the endwall and slidably receiving therethrough a respective one of the electrical terminals; and electrically connecting the electrical busbar connectors to the electrical terminals of the battery cells.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
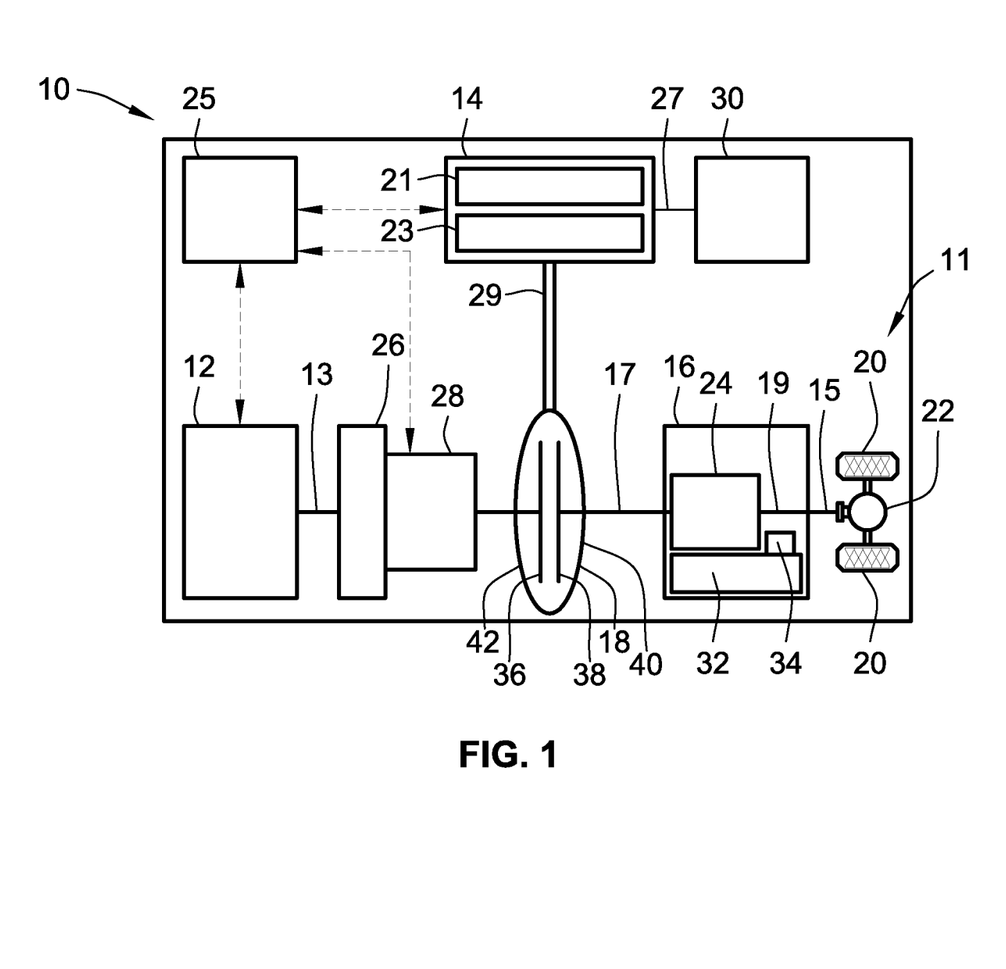
FIG. 1 is a schematic illustration of a representative electric-drive motor vehicle with a hybrid powertrain having an electric traction motor powered by a rechargeable traction battery pack and drivingly connected to a final drive system via a multi-speed power transmission in accordance with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter (TC) assembly 18 to drive one or more road wheels 20 of the vehicle's final drive system 11. The illustrated automobile 10—also referred to herein as "motor vehicle" or "vehicle" for short—is merely an exemplary application with which novel aspects and features of this disclosure can be practiced. In the same vein, implementation of the present concepts into a hybrid electric powertrain should also be appreciated as an exemplary application of the novel concepts disclosed herein. As such, it will be understood that aspects and features of the present disclosure can be applied to other vehicle powertrain architectures, incorporated into any logically relevant type of motor vehicle, and utilized for both automotive and non-automotive applications alike. Lastly, only select components have been shown and will be described in additional detail herein. Nevertheless, the vehicles, powertrains, and battery systems discussed below may include numerous additional and alternative features, and other available peripheral components, for carrying out the various methods and functions of this disclosure.

The representative vehicle powertrain system is shown in FIG. 1 with a prime mover, which is represented herein by a restartable internal combustion engine (ICE) assembly 12 and an electric motor/generator unit 14, that is drivingly connected to a driveshaft 15 of a final drive system 11 by a multi-speed automatic power transmission 16. The engine 12 transfers power, preferably by way of torque via an engine crankshaft 13 ("engine output member"), to an input side of the transmission 16. According to the illustrated example, the ICE assembly 12 rotates an engine-driven torsional damper assembly 26 and, through the torsional damper assembly 26, an engine disconnect device 28. This engine disconnect device 28, when operatively engaged, transmits torque received from the ICE assembly 12 by way of the damper 26 to input structure of the TC assembly 18. As the name implies, the engine disconnect device 28 may be selectively disengaged to drivingly disconnect the engine 12 from the motor 14 and transmission 16.

The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for supply of hydraulic fluid. A shared transmission pump 34 provides sufficient hydraulic pressure for the fluid to selectively activate the elements of the transmission 16, the TC assembly 18 and, for some implementations, the engine disconnect device 28. It may be preferable, for at least some embodiments, that the engine disconnect device 28 comprise an active clutching mechanism, such as a controller-actuated selectable one-way clutch (SOWC) or friction-plate clutch, or a passive clutching mechanism, such as a ratchet-and-pawl or sprag-type freewheel OWC assembly.

The ICE assembly 12 operates to propel the vehicle 10 independently of the electric traction motor 14, e.g., in an "engine-only" operating mode, or in cooperation with the motor 14, e.g., in a "motor-boost" operating mode. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6x4) layouts, etc.

FIG. 1 also depicts an electric motor/generator unit 14 or other suitable traction motor that operatively connects via a motor support hub, shaft, or belt 29 ("motor output member") to torque converter 18, and via torque converter 18 to an input shaft 17 ("transmission input member") of the transmission 16. The motor/generator unit 14 may be directly coupled to a TC input shaft or drivingly mounted to a housing portion of the torque converter 18. The electric motor/generator unit 14 is composed of an annular stator 21 circumscribing and concentric with a rotor 23. Electric power is provided to the stator 21 through electrical conductors or cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including P0, P1, P2.5, P3 and P4 hybrid powertrains, any of which may be adapted for an REV, PHEV, range-extended hybrid vehicle, fuel-cell hybrid vehicle, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts 17, 19. While envisioned as an 8-speed automatic transmission, the power transmission 16 may optionally take on other suitable configurations, including Continuously Variable Transmission (CVT) architectures, automated-manual transmissions, etc.

As indicated above, ECU 25 is constructed and programmed to govern, among other things, operation of the engine 12, motor 14, transmission 16, TC 18, and disconnect device 28. Control module, module, controller, control unit, electronic control unit, processor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines.

Software, firmware, programs, instructions, routines, code, algorithms, and similar terms may be used interchangeably and synonymously to mean any processor-executable instruction sets, including calibrations and look-up tables. The ECU 25 may be designed with a set of control routines executed to provide desired functions. Control routines are executed, such as by a central processing unit, and are operable to monitor inputs from sensing devices and other networked control modules, and execute control and diagnostic routines to govern operation of devices and actuators. Such inputs may include vehicle speed and acceleration data, speed limit data, traffic light status and location data, road gradient data, stop sign location data, traffic flow data, geospatial data, road and lane-level data, vehicle dynamics data, sensor data, etc. Routines may be executed in real-time, continuously, systematically, sporadically and/or at regular intervals, for example, each 100 microseconds, 3.125, 6.25, 12.5, 25 and 100 milliseconds, etc., during vehicle use or operation. Alternatively, routines may be executed in response to occurrence of an event during operation of the vehicle 10.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication with the turbine 38, with a stator (not shown) interposed between the impeller 36 and turbine 38 to selectively alter fluid flow therebetween. The transfer of torque from the engine and motor output members 13, 29 to the transmission 16 via the TC assembly 18 is through stirring excitation of hydraulic fluid, such as transmission oil, inside the TC's internal fluid chamber caused by rotation of the turbine and impeller blades 36, 38. To protect these components, the torque converter assembly 18 is constructed with a TC pump housing, defined principally by a transmission-side pump shell 40 fixedly attached, e.g., via electron beam welding, MIG or MAG welding, laser welding, and the like, to an engine-side pump cover 42 such that a working hydraulic fluid chamber is formed therebetween.

Figure 2:
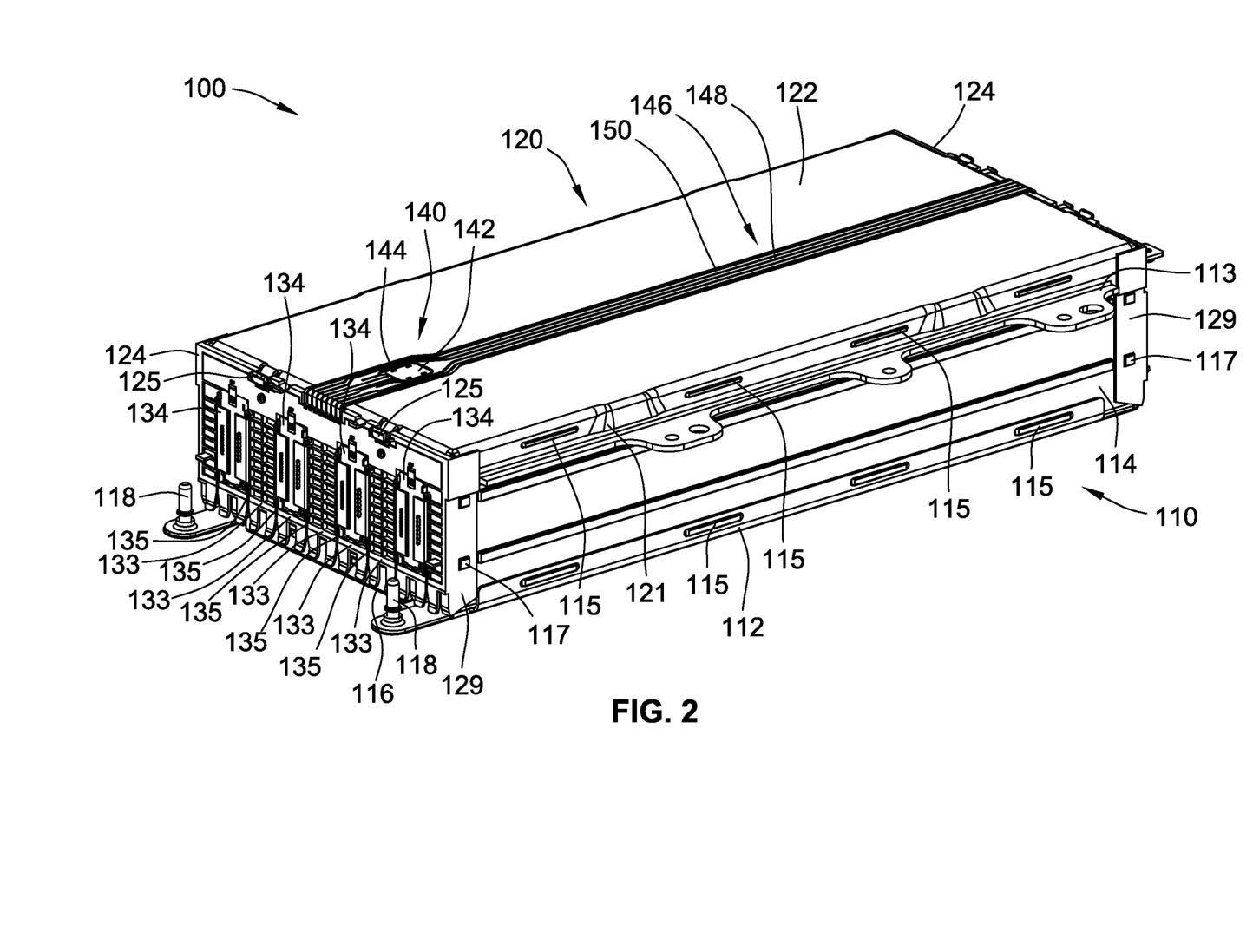
FIG. 2 is an elevated, perspective view illustration of a representative battery module with an integrated electrical ICB assembly in accordance with aspects of the present disclosure.

Turning next to FIG. 2, there is shown a segment of an in-vehicle rechargeable energy storage system (RESS) that is adapted for storing and supplying high-voltage electrical energy used for propelling an electric-drive vehicle, such as hybrid electric vehicle 10 of FIG. 1. This RESS may be a deep-cycle, high-ampere capacity battery system rated for approximately 350 to 800 VDC or more, for example, depending on a desired vehicle range, gross vehicle weight, and power ratings of the various accessory loads drawing electrical power from the RESS. To this end, the RESS employs one or more high-voltage, high-energy-density battery packs, such as traction battery pack 30 of FIG. 1, that is electrically connectable to one or more polyphase permanent magnet (PM) electric machines, such as traction motor 14. Each traction battery pack incorporates an aggregation (e.g., 100's-1000's) of discrete electrochemical cells connected in series and/or parallel to achieve desired total voltage and total current requirements.

Figure 3:
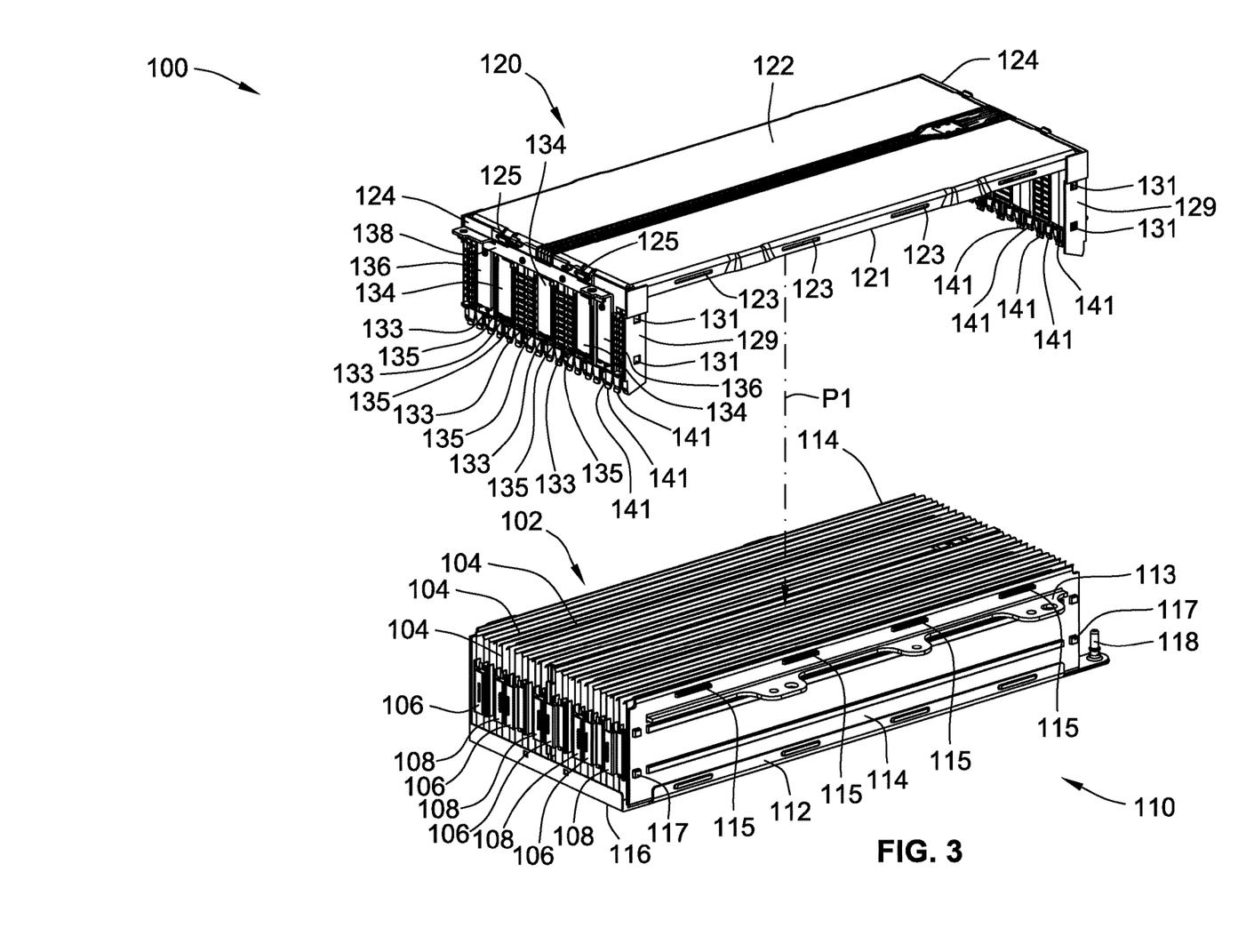
FIG. 3 is a partially exploded, perspective view illustration of the representative battery module of FIG. 2 showing the integrated ICB assembly raised from the battery module housing and stacked electrochemical battery cells.
Figure 4:
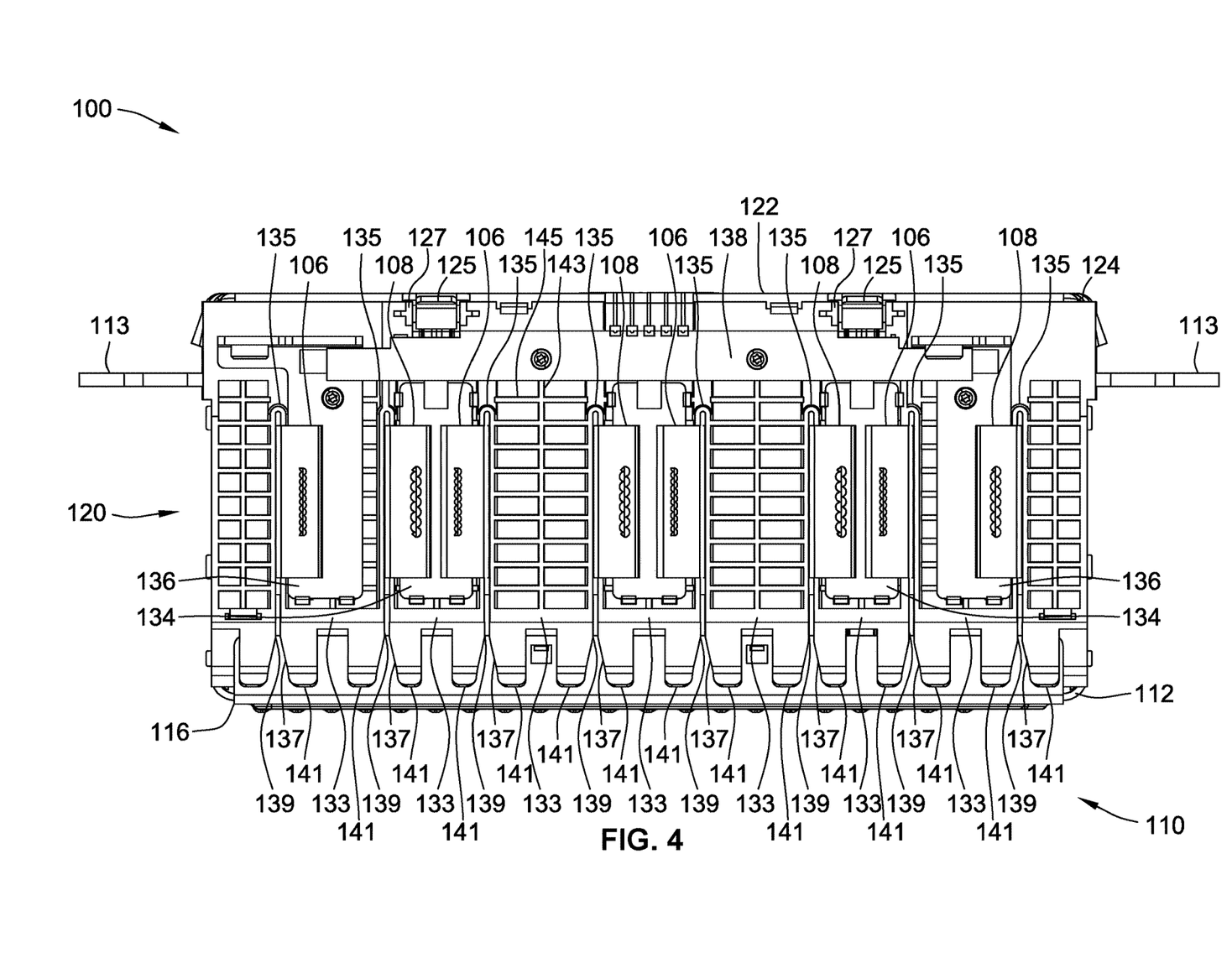
FIG. 4 is an end-view illustration of the representative battery module of FIG. 2 showing one of the ICB assembly endwalls with a cell tab combing feature.

According to the representative configuration, the traction battery pack is generally composed of an array of lithium-ion battery modules, an example of which is illustrated at 100 in FIGS. 2-4. These battery modules 100 are arranged in a pattern of rows and columns, and buttressed on a battery support tray (not shown) that provides subjacent support for the battery packs during vehicle operation. Aspects of the disclosed concepts may be similarly applicable to other electric storage unit architectures, including those employing nickel metal hydride (NiMH) batteries, lead acid batteries, lithium polymer batteries, or other applicable type of rechargeable electric vehicle battery (EVB). Each battery module 100 may include a series of electrochemical battery cells, such as pouch-type lithium ion (Li-ion) or Li-ion polymer battery cells 102 of FIG. 3, for example. For simplification of design and maintenance, and for reduction in cost and assembly time, each battery module 100 may be substantially identical to one another.

An individual lithium-ion battery module 100 may be typified by multiple battery cells 102 (e.g., 20-30) that are stacked in side-by-side facing relation with one another and connected in parallel or series for storing and supplying electrical energy. A battery cell may be a multi-layer construction that is provided with an outer battery casing, which is represented in the drawings by an envelope-like pouch 104 with two rectangular major facing sides. The respective sides of the pouch 104 may be formed of aluminum sheet or foil, or other suitable material, both sides of which may be coated with a polymeric material that insulates the metal from the cell elements and from any adjacent cells. These two sides are connected, e.g., via welding or crimping or other appropriate joining technique, to generally enclose therein a liquid electrolyte composition that conducts positive Lithium ions between working and reference electrodes. Extending outwardly from opposing longitudinal edges of the pouch 104 are negative and positive electrical terminals 106 and 108, respectively, for making electrical connections with negative and positive electrodes (not visible) packaged within the internal volume of pouch 104. While shown as a silicon-based, Li-ion "pouch cell" battery, the battery cells 102 may be adapted to other constructions, including cylindrical and prismatic constructions.

With collective reference to FIGS. 2 and 3, the battery module 100 stores the electrochemical battery cells 102 inside a protective, electrically insulating battery module housing 110. Battery module housing 110 may be a rigid, multi-part construction assembled from a flanged housing base 112 with a pair of elongated module sidewalls 114 that project generally orthogonally from the base 112. Once properly arranged and mounted, the stacked battery cells 102 are supported on the housing base 112 and sandwiched between the module sidewalls 114. For ease of manufacture and assembly, the sidewalls 114 may be substantially identical to each other, both formed from a rigid plastic material with snap fastener projections 115 and 117 for operatively aligning and mechanically connecting the sidewalls 114 with the other protective exterior segments of the battery module 100. Two coplanar mounting brackets 113 extend transversely from the module housing 110, each integrally formed with and projecting at a right angle from a respective module sidewall 114.

A cooling plate 116 is mounted underneath the stacked battery cells 102, seated generally flush against the bottom surface of the housing base 112, to selectively transfer heat out of the battery module 100. This cooling plate 116 is fabricated with one or more coolant channels (not visible in the views provided) that pass therethrough a coolant fluid received via coolant ports 118. The module sidewalls 114 and cooling plate 116 may be fluidly sealed and mechanically attached to the housing base 112, e.g., via snap fasteners and a seal-forming foam. While shown with a generally rectangular-polyhedron shape, it is envisioned that the battery module housing 110 may take on other desired sizes and shapes to accommodate alternative applications with different packaging and design constraints. In the same vein, the module housing 110 may be assembled from greater or fewer segments than that which are shown in the drawings; alternatively, the housing 110 may be molded and machined as a single-piece, unitary structure.

Operatively aligning and electrically interconnecting the battery cells 102 is an integrated interconnect board (ICB) assembly 120 that is mounted on top of the battery module housing 110. In accord with the illustrated example, the integrated ICB assembly 120 provides a protective C-shaped jacket that is generally defined by a flanged central cover 122 with a pair of flanged endwalls 124 that project generally orthogonally from opposing ends of the central cover 122. The central cover 122 is formed from a rigid polymeric material with integral lateral flanges 121 having elongated snap fastener slots 123, which receive therein snap fastener projections 115 of the housing sidewalls 114. A pair of snap-in hooks 125 projects from each longitudinal end of the cover 122 and receives therein mounting pivot pins 127 (FIG. 4) of the ICB endwalls 124. ICB assembly endwalls 124 may be structurally identical, both formed from a rigid polymeric material that is similar to or distinct from the polymeric material used to fabricate the ICB cover 122. As best seen in FIG. 3, each endwall 124 is fabricated with integral mounting flanges 129 that have snap fastener holes 131, which receive therein snap fastener projections 117 of the housing sidewalls 114. Like the module housing 110, the ICB assembly 120 of FIGS. 2-4 may be assembled from greater or fewer than three protective outer segments, namely central cover 122 and endwalls 124; alternatively, the ICB assembly 120 may be molded and machined as a single-piece, unitary structure.

Turning next to FIG. 4, each of the ICB assembly endwalls 124 is segmented into a series of elongated, mutually parallel endwall plates 133 that are arranged side-by-side in a vertical column-like fashion. These endwall plates 133 interleave with and are separated from one another by elongated slots 135. Each of the endwall plates 133 is integrally formed with a succession of flexible snap fastener tabs 141 that project downwardly from a distal edge of the endwall 124. These tabs 141 slidably engage with and press-fit onto the cooling plate 116; in so doing, the integrated ICB assembly 120 mechanically attaches to the battery module housing 110. In the illustrated embodiment, the ICB assembly 120 may be hermetically sealed to the module housing 110. Once the ICB assembly 120 is mounted on the module housing 110, the central cover 122 is positioned in spaced facing relation to the housing base 112 with the battery cells 102 interposed between the ICB endwalls 124. As best seen in FIG. 4, each endwall plate 133 may be integrally formed with intersecting vertical and horizontal ribs 143 and 145, respectively, that cooperatively structurally reinforce the endwall 124.

A series of vertical slots 135 formed into the opposing endwalls 124 allow the integrated ICB assembly 120 of FIGS. 2-4 to mount vertically onto the cell stack 102 and comb the cell terminals 106 and 108 during ICB installation. According to the representative example of FIG. 4, each elongated slot 135 extends upwardly from a bottom-most distal edge of the endwall 124 to slidably receive (e.g., from bottom to top in the Figures) a respective one of the electrical terminals 106, 108. Each of the elongated slots 135 includes a variable width lead-in slot segment 137 that opens at the bottom-most distal edge of the endwall 124, and a rectilinear main slot segment 139 adjoining the lead-in slot segment 137. As shown, the lead-in slot segment 137 has a triangular shape with a narrow end that originates at the main slot segment 139 and a wide end that extends through the distal edge of the endwall 124. The main slot segment 139 originates at the lead-in slot segment 137, extends vertically upward in a straight line, and terminates at an intermediate section of the endwall 124 spaced from an upper-most proximal edge of the endwall 124. With this configuration, multiple positive and negative terminals projecting from first longitudinal ends of the battery cell casings 104 extend through elongated slots in one of the ICB endwalls 124, and multiple positive and negative terminals projecting from second longitudinal ends of the battery cell casings 104 (opposite the first) extend through elongated slots in the other IBC endwall 124. It is desirable, for at least some implementations, that the elongated slots 135 be substantially identical, mutually parallel, and coplanar with one another. The number, length and width of the slots 135 may be varied from the illustrated examples. As yet a further option, the lead-in slot segments 137 may take on alternative shapes, including those with rectilinear and curvilinear edges.

With reference again to FIG. 3, the electrical terminals 106, 108 of each battery cell 102 project outwardly from opposing longitudinal ends of the battery cell casings 104 such that the terminals 106, 108 extend outboard from open, opposing longitudinal ends of the battery module housing 110. To assemble the battery module 100, the integrated ICB assembly 120 "combs" the battery cells 102: each electrical terminal 106, 108 is slidably received in a vertical direction through the bottom-most distal edge of an endwall 124 via an elongated slot 135. As indicated above, the integrated ICB assembly 120 mechanically attaches to the module housing assembly 110 by translating the two assemblies towards one another (or holding one assembly stationary while translating the other assembly) along a generally rectilinear path P1 that is orthogonal to the support face of the housing base 112 and parallel to the vertical lengths of the battery cell electrical terminals 106, 108. The generally linear sliding motion of the electrical terminal 106, 108 along the lengths of the elongated slot 135, whereby the terminal 106, 108 interleaved with endwall plates 133, creates a combing-like motion between the cells 102 and ICB assembly 120.

After mounting the integrated ICB assembly 120 onto the battery module housing 110, the electrical terminals 106, 108 of the battery cells 102 are electrically connected to electrical busbar connectors 134 attached to the ICB endwalls 124. As shown, each electrical busbar connector 134 may be fabricated from an electrically conductive metallic material as a generally rectangular busbar plate that is mounted on an exterior surface of one of the endwalls 124, e.g., via mounting tabs, adhesives and/or fasteners. Likewise, each battery cell electrical terminal 106, 108 may be fabricated from an electrically conductive metallic material as an L-shaped terminal, a portion of which lays flush again and solders, welds or clips to one of the busbar plates 134. A pair of L-shaped inter-module bussing brackets 136 are mounted on one of the ICB endwalls 124. These inter-module bussing brackets 136 cooperatively electrically connect the battery module 100 to an adjacent battery module. A bussing crossbar 138 mounted on the endwall 124 operates to electrically connect both inter-module bussing brackets 136 to the electrical busbar connectors 134.

In addition to providing a protective outer jacket and electrically interconnecting the battery cells 102, the integrated ICB assembly 120 also provides sensing, operating, and electrical isolation functionalities. Such functionality may be provided by an integrated circuit (IC) sensing assembly 140 that is mounted on the central cover 122 or, for some alternative configurations, on one of the endwalls 124. The IC sensing assembly 140 is fabricated with multiple sensing devices 142, such as current, voltage, and/or temperature sensors, that are operable to sense operational characteristics of the battery cells 102. A flexible printed circuit board (PCB) 144 is shown mounted on the central cover 122, supporting thereon the sensing devices 142. A flexible electrical track 146 with multiple electrical traces 148 borne by an electrically insulating track sheet 150 electrically connects the flexible PCB 144 and, thus, the sensing devices 142 to the battery cells 102 via the busbar connectors 134.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A battery module for storing and supplying electrical energy, the battery module comprising:
    a plurality of battery cells stacked in side-by-side facing relation with one another and each including a battery cell casing with an electrical terminal extending therefrom;
    an electrically insulating module housing with a housing base supporting thereon the stacked battery cells; and
    an integrated interconnect board (ICB) assembly attached to the module housing and including a central cover in spaced facing relation to the housing base, endwalls projecting from opposing ends of the central cover, and a plurality of electrical busbar connectors attached to the endwalls and electrically connected to the electrical terminals of the battery cells, one or both of the endwalls defining a plurality of elongated slots each extending from a distal edge of the endwall and slidably receiving therethrough a respective one of the electrical terminals.

2. The battery module of claim 1, wherein each of the elongated slots includes a rectilinear main slot segment adjoining a variable width lead-in slot segment.

3. The battery module of claim 2, wherein the lead-in slot segment originates at the main slot segment and extends through the distal edge of the endwall, and the main slot segment terminates at an intermediate section of the endwall spaced from a proximal edge of the endwall.

4. The battery module of claim 1, wherein the electrical terminals project outwardly from opposing edges of the cell casings such that the electrical terminals project from opposing ends of the module housing, and wherein the integrated ICB assembly is configured to slidably receive the electrical terminals through the distal edges of the endwalls via the elongated slots.

5. The battery module of claim 4, wherein the integrated ICB assembly is configured to mechanically attach to the module housing by translating along a generally rectilinear path orthogonal to the housing base and parallel to the electrical terminals of the battery cells.

6. The battery module of claim 1, wherein each of the endwalls includes a series of columned endwall plates interleaved with and separated by the elongated slots.

7. The battery module of claim 6, further comprising a cooling plate mounted to the housing base and configured to pass therethrough a coolant fluid, wherein each of the endwall plates is integrally formed with a flexible snap-fastener tab projecting from the distal edge of the endwall and configured to attach the integrated ICB assembly to the cooling plate.

8. The battery module of claim 6, wherein each of the endwall plates is integrally formed with intersecting ribs configured to structurally reinforce the endwall.

9. The battery module of claim 1, wherein the integrated ICB assembly further includes an inter-module bussing bracket mounted on one of the endwalls and configured to electrically connect the battery module to an adjacent battery module.

10. The battery module of claim 9, wherein the integrated ICB assembly further includes a bussing crossbar mounted on the one of the endwalls and electrically connecting the inter-module bussing bracket to the electrical busbar connectors.

11. The battery module of claim 1, wherein the integrated ICB assembly further includes an integrated circuit (IC) sensing assembly mounted on the central cover or one of the endwalls, the IC sensing assembly including multiple sensing devices operable to sense operational characteristics of the battery cells.

12. The battery module of claim 11, wherein the IC sensing assembly includes:
    a flexible printed circuit board (PCB) mounted on the central cover and supporting thereon the sensing devices; and
    an electrical track with a plurality of traces borne by an electrically insulating track sheet and electrically connecting the flexible PCB to the battery cells via the busbar connectors.

13. The battery module of claim 1, wherein each of the electrical busbar connectors includes a generally rectangular busbar plate mounted on an exterior surface of one of the endwalls, and each of the electrical terminals of the battery cells includes an L-shaped terminal segment abutting one of the busbar plates.

14. The battery module of claim 1, wherein each of the electrical terminals includes:
    a positive terminal projecting from a first end of the battery cell casing, extending through one of the elongated slots in one of the endwalls, and abutting one of the electrical busbar connectors; and
    a negative terminal projecting from a second end of the battery cell casing, extending through another one of the elongated slots in another one of the endwalls, and abutting another one of the electrical busbar connectors.

15. An electric-drive motor vehicle comprising:
a vehicle body with a plurality of road wheels attached to the vehicle body;
a traction motor attached to the vehicle body and configured to drive one or more of the road wheels to thereby propel the motor vehicle; and
a traction battery pack attached to the vehicle body and configured to power the traction motor, the traction battery pack including a plurality of battery modules, each of the battery modules including:
a plurality of electrochemical battery cells stacked in side-by-side facing relation with one another, each of the electrochemical battery cells including a battery cell casing with positive and negative electrical terminals extending therefrom;
an electrically insulating module housing with multiple housing walls and a housing base supporting thereon the stacked battery cells; and
an integrated interconnect board (ICB) assembly mounted on the module housing and including a central cover in spaced facing relation to the housing base, a pair of endwalls projecting generally orthogonally from opposing ends of the central cover, and a plurality of electrical busbar connectors mounted on the endwalls and electrically connected to the electrical terminals of the battery cells, each of the endwalls defining a plurality of elongated slots each extending from a distal edge of the endwall and slidably receiving therethrough a respective one of the electrical terminals.

16. A method of assembling a battery module for storing and supplying electrical energy, the method comprising:
stacking a plurality of battery cells in side-by-side facing relation with one another, each of the battery cells including a battery cell casing with an electrical terminal extending therefrom;
seating the stacked battery cells on a housing base of an electrically insulating module housing;
attaching an integrated interconnect board (ICB) assembly to the module housing, the integrated ICB assembly including a central cover positioned in spaced facing relation to the housing base, endwalls projecting from opposing ends of the central cover, and a plurality of electrical busbar connectors attached to the endwalls, one or both of the endwalls defining a plurality of elongated slots each extending from a distal edge of the endwall and slidably receiving therethrough a respective one of the electrical terminals; and
electrically connecting the electrical busbar connectors to the electrical terminals of the battery cells.

17. The method of claim 16, wherein each of the elongated slots includes a rectilinear main slot segment adjoining a variable width lead-in slot segment.

18. The method of claim 17, wherein the lead-in slot segment originates at the main slot segment and extends through the distal edge of the endwall, and the main slot segment terminates at an intermediate section of the endwall spaced from a proximal edge of the endwall.

19. The method of claim 16, wherein the electrical terminals project outwardly from opposing edges of the cell casings such that the electrical terminals project from opposing ends of the module housing, and wherein attaching the integrated ICB assembly includes slidably receiving the electrical terminals through the distal edges of the endwalls via the elongated slots.

20. The method of claim 16, wherein attaching the integrated ICB assembly includes:
translating the integrated ICB assembly along a generally rectilinear path orthogonal to the housing base and parallel to the electrical terminals of the battery cells; and
mechanically attaching the distal edges of the endwalls to a cooling plate mounted underneath the housing base.

* * * * *